Figure 1:
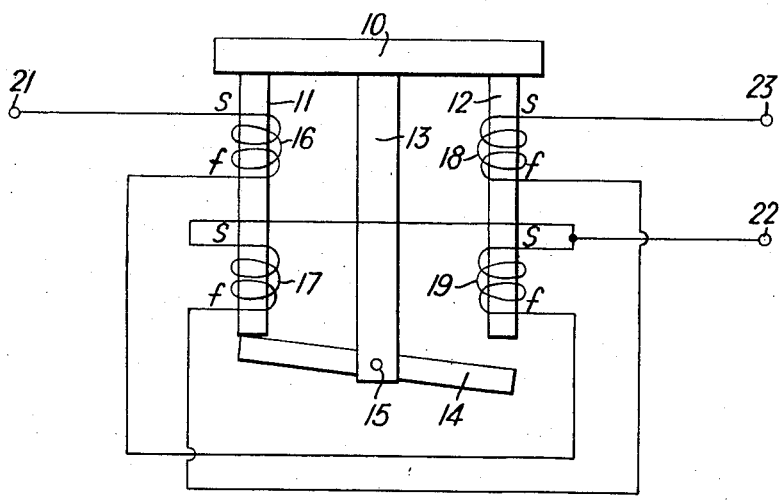

July 3, 1962  H. B. EDWARDS ET AL  3,042,843
POLARIZED A.C. RINGERS
Filed Nov. 19, 1958  2 Sheets-Sheet 1

Inventors
HUW BRYANT EDWARDS
VICTOR MICHAEL ANDERSON
By Toulmin & Toulmin
Attorneys July 3, 1962  H. B. EDWARDS ET AL  3,042,843
POLARIZED A.C. RINGERS
Filed Nov. 19, 1958  2 Sheets-Sheet 2

Fig. 2.

Fig. 4.

Inventors
HUW BRYANT EDWARDS
VICTOR MICHAEL ANDERSON
By Toulmin & Toulmin
Attorneys

3,042,843
POLARIZED A.C. RINGERS
Huw Bryant Edwards and Victor Michael Anderson, Beeston, England, assignors to Ericsson Telephones Limited, London, England
Filed Nov. 19, 1958, Ser. No. 774,880
Claims priority, application Great Britain Jan. 8, 1958
4 Claims. (Cl. 317—188)

This invention relates to improvements in alternating current ringers such as those used in telephone systems or the like of the kind comprising a permanent magnet and two iron cores, each having a winding which windings are connected in series mounted all either side of the permanent magnet on a yoke to provide an E-shaped construction, and having an armature pivotally mounted on the free end of the permanent magnet, so that each end of the armature may be attracted to a co-operating pole face of an iron core, in response to alternating current in the windings. Usually a striker provided on the armature is adapted to strike a gong in response to movements of the armature.

In some telephone circuits, for example when a simpler dialling system is in use, the telephone ringer is connected across the lines and provides a suitable means for obtaining a center tap between the two lines. In such a system the junction between the two ringer coils is used for this purpose and may be connected to earth.

Difficulties have been encountered in such systems using ringers of the kind described. Such difficulties are of two kinds. In the first place it is desirable that the center tap provided by the ringer should be balanced to each line both resistively and inductively. If this is not the case induction from neighbouring power circuits and other disadvantages follow, particularly in party line systems. Ringers as described provide resistive balance, but the inductance of the coils is unequal and depends upon the position of the armature, which may be in contact with one or other pole face, leaving unequal air gaps in the magnetic circuits associated with each winding.

A further difficulty arises from interfering signals, which may be picked up by both lines. In the arrangement described above such signals may enter both ringer windings in the same direction and pass to earth through the center tap. The magnetic fields produced by such signals pass through the permanent magnet of the ringer and tend, if in a certain direction, to demagnetize the magnet. Interfering signals of this kind may well be induced in telephone lines from neighbouring power lines, and may be of considerable magnitude.

It is an object of the present invention to provide a ringer in which the above difficulties are overcome.

In accordance with the invention an alternating current ringer of the kind described is provided with at least two windings on each core each of said windings having substantially the same number of turns, and at least one winding on one core is connected in series with at least one winding on the other core, with a center tap between the groups of series-connected windings. The invention also includes an alternating current ringer of the kind described, having two windings on each core, each of said windings having substantially the same number of turns, and having one winding on one core connected in series with one winding on the other core, with a center tap between the pairs of series-connected windings.

It is, of course, necessary for the said windings to be connected in the correct phase to allow normal operation of the ringer when an alternating voltage is applied to the said windings.

It is preferred for convenience in manufacture to wind one of said windings on each said core on top of the other winding in which case one of said windings on each core will have higher resistance than the other because the turns have a greater mean diameter. Under these circumstances the windings are interconnected so that a high and low resistance coil are provided on each side of the center tap.

Figure 3:
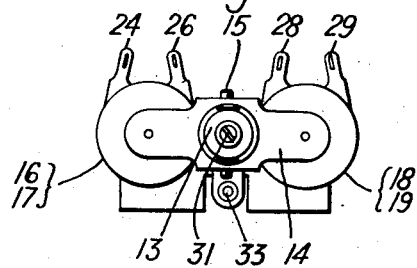

In order that the invention may be better understood reference will now be made to the accompanying drawings in which:

FIGURE 1 illustrates schematically a ringer according to the invention;
FIGURE 2 is a plan view and
FIGURE 3 is an end elevation of such a ringer, while,
FIGURE 4 is a cross sectional view, on a somewhat larger scale than in FIGURES 2 and 3, showing the pivotal mounting of the armature.

The ringer shown in the drawings comprises a yoke 10 to which are attached cores 11 and 12 and magnet 13. Armature 14 is pivoted at 15 to the magnet 13. Core 11 carries windings 16 and 17 and core 12 carries windings 18 and 19. For convenience in manufacture windings 16 and 18 are first wound on cores 11 and 12 respectively and windings 17 and 19 are wound over windings 16 and 18. Windings 17 and 19 are therefore longer than windings 16 and 18 and have a higher resistance. In FIG. 1 the start and finish of the windings are denoted by the letters $s$ and $f$ respectively. The start of winding 16 provides one terminal 21 of the ringer and the finish of this winding is connected to the finish of coil 19. The start of winding 19 is connected to the start of winding 17 and this connection forms the center tap 22 of the ringer. This series circuit network of windings 16 and 19 form a group connected between terminals 21 and 22. The finish of winding 17 is connected to the finish of winding 18, the start of which provides the second terminal 23 of the ringer. This series circuit network of windings 17 and 18 is a second group connected between terminals 22 and 23. All the windings are in the same direction.

In operation an A.C. ringing signal applied between 21 and 23 operates the bell in the usual manner because the current at any one time in the windings produces flux which assists the permanent flux in one core and opposes the permanent flux in the other core.

With the armature 14 in the position shown in FIG. 1 the inductance of windings 16 and 17 is greater than the inductance of windings 18 and 19, because although all windings have the same number of turns the magnetic circuit associated with windings 18 and 19 contains a relatively large air gap between the armature 14 and the core 12, while there is little or no air gap between the armature and core 11. The inductance of windings 16 and 17 are however substantially equal because these windings are associated with the same magnetic circuit and have the same number of turns. The same applies to windings 18 and 19. For this reason the inductance between 21 and 23 and the center tap 22 is substantially equal because such inductance is provided by an inductance 16 in series with a lower inductance 19 between 21 and 22, and substantially equal inductances 17 and 18 respectively between 23 and 22. Obviously a similar state will exist when the armature is in the other position and there is a relatively large air gap between 14 and core 11 and little or no air gap between 14 and 12. The two sides of the ringer are therefore inductively balanced with respect to the center tap 22.

The two sides of the ringer are also in resistive balance because the resistances of windings 16 and 18 are substantially the same, as are the resistances of windings 17 and 19, although 17 and 19, having a longer mean turn length, have a higher resistance than 16 and 18. Reference to FIG. 1 will show that substantially similar resistances are provided on each side of the center tap by windings 16 and 19 in series, and by windings 17 and 18 in series.

If an interfering signal is applied between the two terminals of a ringer of the kind described and the center tap there exists, as previously explained, a possibility that flux in opposition to the permanent magnet will demagnetize the magnet. With the ringer of the present invention the four windings oppose each other in pairs on each core and there is thus no demagnetizing flux in the permanent magnet.

In the construction form illustrated in FIGS. 2–4 certain external connections between the various windings have been omitted. Winding 16 extends between terminal tags 21, 24, winding 17 between tags 25, 26, winding 18 between tags 23, 29, and winding 19 between tags 27, 28. Tag 24 is connected externally to tag 28 and tag 26 to tag 29. The center tap 22 of FIGURE 1 is provided by connecting tags 27 and 25.

This arrangement not only provides that no external conversions are made to the armature ends of the coils, but also makes ringers as described interchangeable with previous ringers having single coils on each core.

The armature 14 is conveniently pivoted on the magnet 13 by means of a pivot pin 15 which transfixes the magnet and a plug 30 let into the magnet. The plug is forced against the pin 15 by a screw 31 so that it is locked in position. The armature has lugs 14a, 14b which are transfixed by the ends of the pivot pin 15, bushes 32a, 32b may be provided which are either fixed in the lugs 14a, 14b and work on the pin 15, or alternatively are fixed on the pin and provide bearing surfaces of substantial area on which the lugs work. The lug 14b carries a striker 33 for co-operating with gongs 34a, 34b.

We claim:

1. An A.C. ringer comprising: a pair of cores, a yoke attached to said cores, a permanent magnet also attached with one end to said yoke inbetween said cores so as to define an E-shaped structure, an armature pivotally mounted on the other end of said permanent magnet; first and second winding means on one of said cores; third and fourth winding means on the other one of said core, a first and a second terminal means for forming a series circuit connection of said winding means in the following sequence: first terminal, first winding means third winding means, second winding means, fourth winding means, second terminals and a center tap for grounding said windings and being disposed between said second and third winding means so that inductance and resistance as appearing between said first terminal and said tap and the respective inductance and resistance between said tap and said second terminal are substantially equal independent from the respective position of said armature.

2. An A.C. ringer as set forth in claim 1 each of said winding means consisting of a winding with all windings having an equal number of turns.

3. An A.C. ringer as set forth in claim 2, said first and second windings being wound on top of each other, said third and fourth windings being wound on top of each other, whereby the outer windings have a higher resistance than the respective inner windings.

4. An A.C. ringer comprising: an E-shaped core structure having two outer cores and a center core, the latter core being a permanent magnet; an armature pivotally mounted on the free end of said permanent magnet; a first group of windings connected in series circuit connection and including at least one winding on each outer core; a second group of windings connected in series circuit connection and including at least one winding on each outer core, said first and said second group having similar resistance and inductance; and a junction for said two groups of windings defining a center tap.

References Cited in the file of this patent

UNITED STATES PATENTS

| | | |
|---|---|---|
| 681,744 | Scribner | Sept. 3, 1901 |
| 2,274,775 | Cox | Mar. 3, 1942 |